US012658808B2

(12) United States Patent
Medina-Garcia

(10) Patent No.: US 12,658,808 B2
(45) Date of Patent: Jun. 16, 2026

(54) ASYMMETRICAL HALF BRIDGE FLYBACK POWER CONVERTERS AND METHODS

(71) Applicant: Infineon Technologies Austria AG, Villach (AT)

(72) Inventor: Alfredo Medina-Garcia, Munich (DE)

(73) Assignee: Infineon Technologies Austria AG, Villach (AT)

( * ) Notice: Subject to any disclaimer, the term of this patent is extended or adjusted under 35 U.S.C. 154(b) by 584 days.

(21) Appl. No.: 18/203,836

(22) Filed: May 31, 2023

(65) Prior Publication Data

US 2024/0405685 A1 Dec. 5, 2024

(51) Int. Cl.
| | |
|---|---|
| *H02M 3/335* | (2006.01) |
| *H02M 1/00* | (2006.01) |
| *H02M 1/088* | (2006.01) |
| *H02M 3/00* | (2006.01) |

(52) U.S. Cl.
CPC ..... *H02M 3/33571* (2021.05); *H02M 1/0003* (2021.05); *H02M 1/088* (2013.01); *H02M 3/01* (2021.05); *H02M 1/0009* (2021.05)

(58) Field of Classification Search
CPC ............. H02M 1/0003; H02M 1/0009; H02M 1/0043; H02M 1/0067; H02M 1/007; H02M 1/0074; H02M 1/0077; H02M 1/08; H02M 1/088; H02M 3/01; H02M 3/1584; H02M 3/1586; H02M 3/335; H02M 3/33507; H02M 3/33569; H02M 3/33571; H02M 3/33573; H02M 3/337; H02M 3/3372; Y02B 70/10
See application file for complete search history.

(56) References Cited

U.S. PATENT DOCUMENTS

| | | | | |
|---|---|---|---|---|
| 2010/0328968 A1* | 12/2010 | Adragna | ................. | H02M 3/01 |
| | | | | 363/21.02 |
| 2016/0072388 A1* | 3/2016 | Dubus | ................. | H02M 3/3376 |
| | | | | 363/25 |
| 2017/0070150 A1* | 3/2017 | Kim | ...................... | H02M 3/285 |
| 2018/0091059 A1* | 3/2018 | Nene | ...................... | H02M 1/084 |
| 2020/0112257 A1* | 4/2020 | Fahlenkamp | ..... | H02M 3/33592 |
| 2022/0271674 A1* | 8/2022 | Yang | ................. | H02M 3/33571 |
| 2022/0345035 A1* | 10/2022 | Mazgut | ............... | H02M 1/0019 |
| 2024/0186909 A1* | 6/2024 | Zhang | ..................... | H02M 1/08 |

* cited by examiner

*Primary Examiner* — Thienvu V Tran
*Assistant Examiner* — Shahzeb K Ahmad
(74) *Attorney, Agent, or Firm* — Armis IP Law, LLC

(57) ABSTRACT

A power supply controller is operative to: control switching of a first asymmetrical half bridge flyback power converter to supply first current from a secondary winding SW1 of the first asymmetrical half bridge flyback power converter during a first portion of a switch control cycle to produce an output voltage, the first asymmetrical half bridge flyback power converter operative to block the first current through the secondary winding SW1 during a second portion of the control cycle; and control switching of a second asymmetrical half bridge flyback power converter to supply second current from a secondary winding SW2 of the second asymmetrical half bridge flyback power converter during a second portion of the switch control cycle to produce the output voltage, the second asymmetrical half bridge flyback power converter operative to block the second current through the secondary winding SW2 during the first portion of the control cycle.

20 Claims, 12 Drawing Sheets

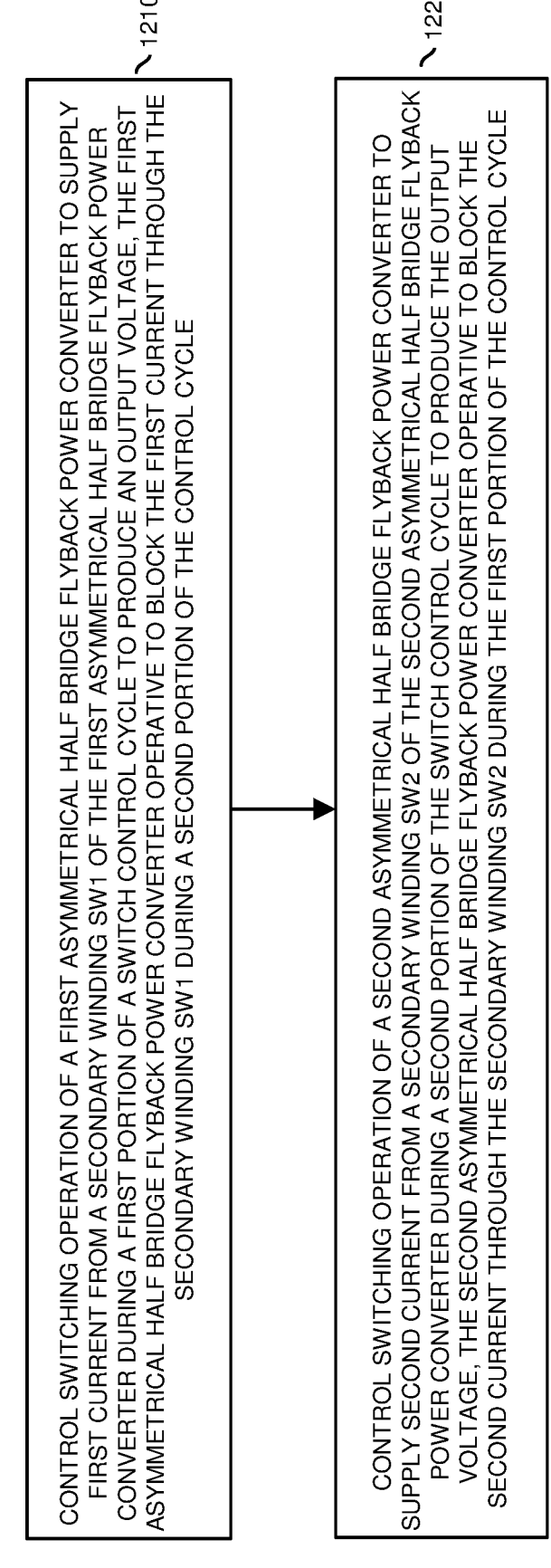

1200

1210
CONTROL SWITCHING OPERATION OF A FIRST ASYMMETRICAL HALF BRIDGE FLYBACK POWER CONVERTER TO SUPPLY FIRST CURRENT FROM A SECONDARY WINDING SW1 OF THE FIRST ASYMMETRICAL HALF BRIDGE FLYBACK POWER CONVERTER DURING A FIRST PORTION OF A SWITCH CONTROL CYCLE TO PRODUCE AN OUTPUT VOLTAGE, THE FIRST ASYMMETRICAL HALF BRIDGE FLYBACK POWER CONVERTER OPERATIVE TO BLOCK THE FIRST CURRENT THROUGH THE SECONDARY WINDING SW1 DURING A SECOND PORTION OF THE CONTROL CYCLE

1220
CONTROL SWITCHING OPERATION OF A SECOND ASYMMETRICAL HALF BRIDGE FLYBACK POWER CONVERTER TO SUPPLY SECOND CURRENT FROM A SECONDARY WINDING SW2 OF THE SECOND ASYMMETRICAL HALF BRIDGE FLYBACK POWER CONVERTER DURING A SECOND PORTION OF THE SWITCH CONTROL CYCLE TO PRODUCE THE OUTPUT VOLTAGE, THE SECOND ASYMMETRICAL HALF BRIDGE FLYBACK POWER CONVERTER OPERATIVE TO BLOCK THE SECOND CURRENT THROUGH THE SECONDARY WINDING SW2 DURING THE FIRST PORTION OF THE CONTROL CYCLE

FIG. 12

ASYMMETRICAL HALF BRIDGE FLYBACK POWER CONVERTERS AND METHODS

BACKGROUND

A so-called conventional Hybrid flyback (HFB) power converter includes a HS (high-side) switch and a LS (low side switch). In general, via switching of the switches in the HFB power converter, energy is transferred from a corresponding transformer and a resonant capacitor through a primary winding to a secondary winding. Circuitry in the HFB power converter coupled to the secondary winding (such as a synchronous rectifier) produces a respective output voltage.

BRIEF DESCRIPTION

This disclosure includes the observation that, in conventional HFB power converters, the currents at input and output capacitors are larger compared to LLC or PSFB converters. This is due to lower duty cycle being used to transfer energy in the HFB compared to the LLC. The lack of duty cycle control limits use of the HFB in (very) high power applications.

According to one example as discussed herein, an apparatus (such as a power supply) includes a controller. The controller is operative to: control switching of a first asymmetrical half bridge flyback power converter to supply first current from a secondary winding SW1 of the first asymmetrical half bridge flyback power converter during a first portion of a switch control cycle to produce an output voltage, the first asymmetrical half bridge flyback power converter operative to block the first current through the secondary winding SW1 during a second portion of the control cycle; and control switching of a second asymmetrical half bridge flyback power converter to supply second current from a secondary winding SW2 of the second asymmetrical half bridge flyback power converter during a second portion of the switch control cycle to produce the output voltage, the second asymmetrical half bridge flyback power converter operative to block the second current through the secondary winding SW2 during the first portion of the control cycle.

The controller can be configured to switch both of the first asymmetrical half bridge flyback power converter and the second asymmetrical half bridge flyback power converter at a common switching frequency.

The first asymmetrical half bridge flyback power converter may be a resonant power converter; and the second asymmetrical half bridge flyback power converter may be a resonant power converter. The controller may be configured to adjust a magnitude of a common switching frequency applied to the first asymmetrical half bridge flyback power converter and the second asymmetrical half bridge flyback power converter to regulate a magnitude of output current supplied by the output voltage to a load.

In accordance with yet further examples, the controller can be configured to: i) implement a first feedback control loop to control magnitudes of the first current and the second current to maintain a magnitude of the output voltage, and ii) implement a second feedback control loop to equalize a magnitude of the first current and a magnitude of the second current.

In accordance with still further examples as discussed herein, the controller can be configured to switch between activation and deactivation of the second asymmetrical half bridge flyback power converter depending on a magnitude of a load powered by the output voltage.

The controller can be configured to control operation of N asymmetrical half bridge flyback power converters including the first asymmetrical half bridge flyback power converter and the second asymmetrical half bridge flyback power converter. The value N may be an integer number of asymmetrical half bridge flyback power converters controlled by the controller. The controller can be configured to apply a different phase shift associated with first control signals controlling the first asymmetrical half bridge flyback power converter and second control signals controlling the second asymmetrical half bridge flyback power converter depending on how many of the N asymmetrical half bridge flyback power converters are simultaneously activated to produce the output voltage.

The controller can be implemented as a semiconductor chip.

Yet further, the first asymmetrical half bridge flyback power converter can be connected in series between an input voltage source and a reference voltage. The controller can be configured to regulate a magnitude of a voltage at a node coupling the first asymmetrical half bridge flyback power converter and the second asymmetrical half bridge flyback power converter to substantially equalize a magnitude of the first current and the second current.

In accordance with still further examples, the controller can be configured to: monitor a magnitude of a first output current supplied by the first asymmetrical half bridge flyback power converter to a load; monitor a magnitude of a second output current supplied by the second asymmetrical half bridge flyback power converter to the load. To balance the magnitude of the first output current and the magnitude of the second output current, the controller is operative to: i) adjust a first duty cycle of controlling current through a primary winding PW1 of the first resonant flyback power converter, the secondary winding SW1 inductively coupled to the primary winding PW1; and ii) adjust a second duty cycle of controlling current through a primary winding of the first resonant flyback power converter, the secondary winding SW2 inductively coupled to the primary winding PW2. In one example, the monitored magnitude of the first output current is a peak associated with the first output current; and the monitored magnitude of the second output current is a peak associated with the second output current. For example, the monitored magnitude of the first output current can be determined based on measurement of peak current through the primary winding PW1; and the monitored magnitude of the second output current can be determined based on measurement of peak current through the primary winding PW2; and so on.

The controller can be implemented in any suitable manner. For example, the controller can be configured to include a master controller portion and a slave controller portion. The master controller portion can be configured to control first switches in the first asymmetrical half bridge flyback power converter to produce the output voltage; the slave controller portion can be configured to control second switches in the second asymmetrical half bridge flyback power converter to produce the output voltage. The master controller portion can be configured to receive feedback associated with generation of the output voltage. Based on a magnitude of the feedback with respect to a setpoint reference value, the master controller can be configured to control a magnitude of a switching frequency of controlling the first switches to produce a first output current from the first asymmetrical half bridge flyback power converter. The first output current contributes to generation of the output voltage. The master controller portion can be configured to: i) produce error information indicating a difference between a magnitude of the first output current and the second output current, and ii) forward the error information and the magnitude of the switching frequency to the first slave controller.

In accordance with yet further examples, the first slave controller portion is operative to: i) monitor a magnitude of the second output current supplied by the second asymmetrical half bridge flyback power converter based on a magnitude of current through a primary winding PW2 of the second asymmetrical half bridge flyback power converter, the primary winding PW2 inductively coupled to the second winding SW2 of the second asymmetrical half bridge flyback power converter, and ii) adjusting a duty cycle of controlling the second switches based on the error information and the magnitude of current through the primary winding.

Still further examples as discussed herein include a method comprising: controlling switching operation of a first asymmetrical half bridge flyback power converter to supply first current from a secondary winding SW1 of the first asymmetrical half bridge flyback power converter during a first portion of a switch control cycle to produce an output voltage, the first asymmetrical half bridge flyback power converter operative to block the first current through the secondary winding SW1 during a second portion of the control cycle; and controlling switching operation of a second asymmetrical half bridge flyback power converter to supply second current from a secondary winding SW2 of the second asymmetrical half bridge flyback power converter during a second portion of the switch control cycle to produce the output voltage, the second asymmetrical half bridge flyback power converter operative to block the second current through the secondary winding SW2 during the first portion of the control cycle.

The controller can be configured to switch both of the first resonant flyback power converter and the second resonant flyback power converter at a common switching frequency.

The controller can be configured to monitor a magnitude of the first output current; monitor a magnitude of the second output current; and to balance the magnitude of the first output current and the magnitude of the second output current: i) adjusting a first duty cycle of controlling current through a primary winding PW1 of the first resonant flyback power converter, the secondary winding SW1 inductively coupled to the primary winding PW1; and ii) adjusting a second duty cycle of controlling current through a primary winding of the first resonant flyback power converter, the secondary winding SW2 inductively coupled to the primary winding PW2.

Yet further, the method as discussed herein can include: implementing a first feedback control loop to control magnitudes of the first current and the second current to maintain a magnitude of the output voltage; and implementing a second feedback control loop to balance a magnitude of the first current and a magnitude of the second current.

These and other more specific embodiments are disclosed in more detail below.

In addition to potentially being implemented as an analog controller and corresponding analog circuitry/components as described herein, note that any of the resources as discussed herein can include one or more computerized devices, apparatus, hardware, etc., execute and/or support any or all of the method operations disclosed herein. In other words, one or more computerized devices or processors can be programmed and/or configured to operate as explained herein to carry out the different embodiments as described herein.

Yet other embodiments herein include software programs to perform the steps and/or operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate generation of an output voltage to power a load. The instructions, when executed by computer processor hardware, cause the computer processor hardware to: control switching operation of a first asymmetrical half bridge flyback power converter to supply first current from a secondary winding SW1 of the first asymmetrical half bridge flyback power converter during a first portion of a switch control cycle to produce an output voltage, the first asymmetrical half bridge flyback power converter operative to block the first current through the secondary winding SW1 during a second portion of the control cycle; and control switching operation of a second asymmetrical half bridge flyback power converter to supply second current from a secondary winding SW2 of the second asymmetrical half bridge flyback power converter during a second portion of the switch control cycle to produce the output voltage, the second asymmetrical half bridge flyback power converter operative to block the second current through the secondary winding SW2 during the first portion of the control cycle.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although embodiments as discussed herein are applicable to controlling switches in a power supply operable to generate an output voltage, the concepts disclosed herein may be advantageously applied to any other suitable voltage converter topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 12 is an example diagram illustrating a general method of providing power converter control as discussed herein.

Figure 1:
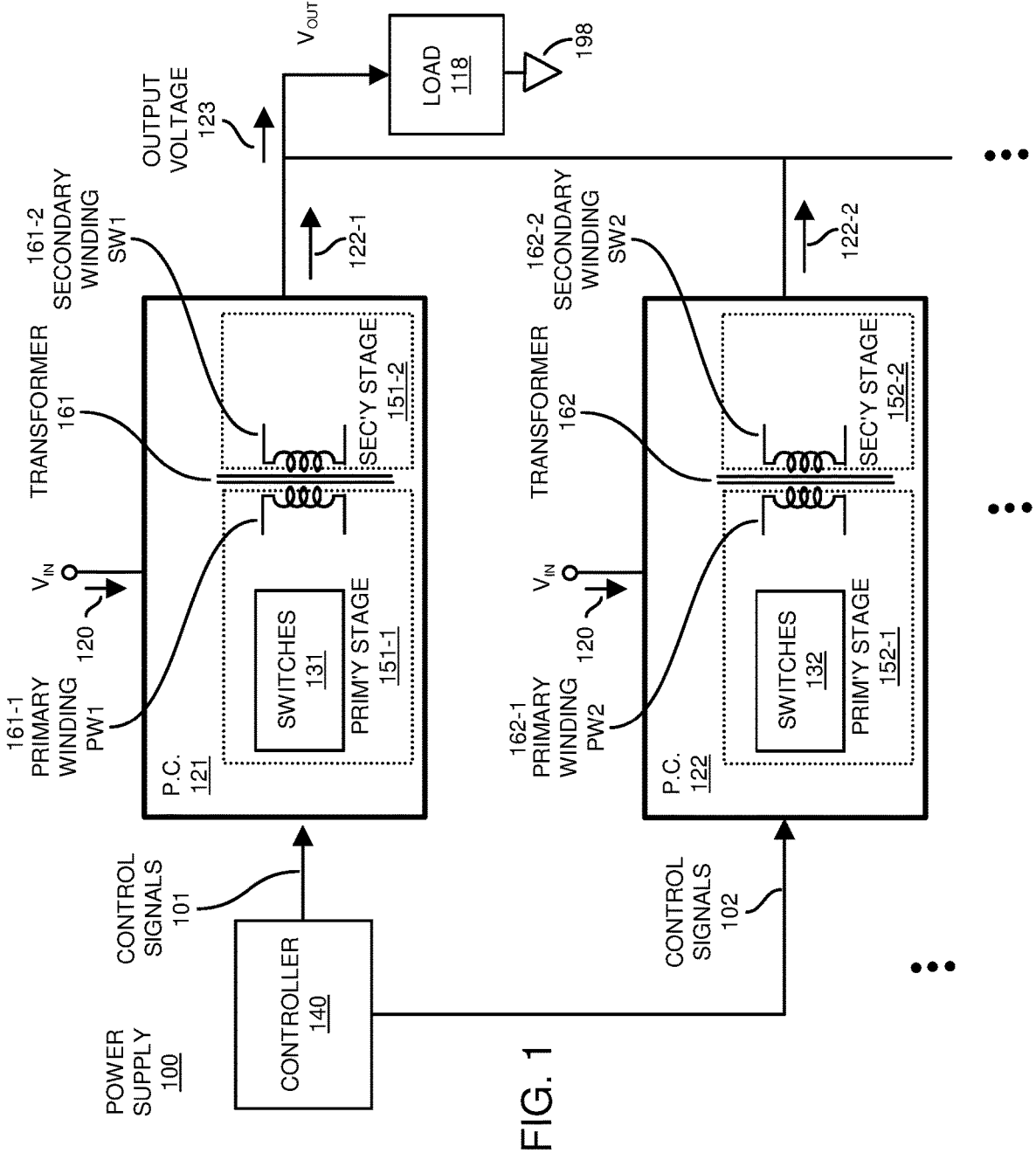
FIG. 1 is an example general diagram illustrating a power supply including multiple power converter phases as described herein.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Now, more specifically, FIG. 1 is an example diagram illustrating a power supply according to embodiments herein.

As shown in this example embodiment, power supply 100 (such as an apparatus, electronic device, resonant power converter, etc.) includes a controller 140 (such as one or more control functions and/or hardware centrally located or disparately located) and power converter 121 (such as a first power converter phase), power converter 122 (such as a second power converter phase), etc.

Power converter 121 (such as a resonant power converter) includes switches 131, transformer 161, etc. Transformer 161 includes primary winding PW1 (a.k.a., 161-1) and secondary winding SW1 (a.k.a., 161-2). Primary stage 151-1 of the power converter 121 includes switches 131, primary winding PW1, and other circuit components. The secondary stage 151-2 of the power converter 121 can be configured to include secondary winding SW1 as well as other circuit components.

Power converter 122 (such as a resonant power converter) includes switches 132, transformer 162, etc. Transformer 162 includes primary winding PW2 (a.k.a., 162-1) and secondary winding SW2 (a.k.a., 162-2). Primary stage 152-1 of the power converter 122 includes switches 132, primary winding PW2, and other circuit components. The secondary stage 152-2 of the power converter 122 can be configured to include secondary winding SW2 as well as other circuit components.

Power supply 100 includes any number of power converters disposed in parallel to power the load 118.

As further shown, the power converter 121 receives the corresponding input voltage 120 supplied by the voltage source Vin (such as a DC input voltage source). The power converter 121 converts the received input voltage 120 (such as a DC input voltage) into the output current 122-1 to produce the output voltage 123 powering the corresponding load 118.

The power converter 122 receives the corresponding input voltage 120 supplied by the voltage source Vin (such as a DC input voltage source). The power converter 122 converts the received input voltage 120 into the output current 122-2 to produce the output voltage 123 powering the corresponding load 118.

Thus, the combination of the output current 122-1 and output current 122-2 power the load 118.

In one example, the power converter 121 is implemented as a first asymmetrical half bridge flyback power converter; the power converter 122 is implemented as a second asymmetrical half bridge flyback power converter; and so on.

Note that each of the resources as described herein can be instantiated in any suitable manner. For example, each of the controller 140 and respective one or more power converters in power supply 100 can be instantiated as or include hardware (such as circuitry), software (executed instructions), or a combination of hardware and software resources.

During operation, controller 140 produces one or more control signals 101 (such as one or more pulse width modulation signals) that control states of respective control switches 131 in the power converter 121 to produce the output current 122-1 and corresponding output voltage 123; controller 110 produces one or more control signals 102 (such as one or more pulse width modulation signals) that control states of respective control switches 132 in the power converter 122 to produce the output current 122-2 and corresponding output voltage 123; and so on.

Note that switches 131 and 132 can be any suitable type of components. For example, each of or any of the switches 131 and switches 132 may be a field effect transistor, bipolar junction transistor, etc.

As further shown, the power stage 121 receives the input voltage 120 (Vin, such as a DC input voltage). As previously discussed, transformer 161 includes a primary winding 161-1 (PW1) and a secondary winding 161-2 (SW1). The secondary winding 161-2 is inductively or magnetically coupled to the primary winding 161-1 to receive energy provided by the input voltage 120. For example, control of current through the primary winding 161-1 stores energy in the primary winding 161-1. The stored energy transfers from the primary winding 161-1 to the secondary winding 161-2 to produce the output voltage 123 (or output current 122-1).

As further discussed herein, controller 140 of the power supply 100 controllably switches the switches 131 in or associated with a respective circuit path including the primary winding 161-1 of transformer 161 to convey energy to the secondary winding 161-2. One or more of the switches 131 may be connected in series. The switching of switches 131 causes a change in a magnitude of current flowing through the primary winding 161-1. The secondary stage 151-2 of the power converter 121 converts the received energy from the primary winding 161-1 into the output current 122-1 and corresponding output voltage 123 that powers the load 118.

Controller 140 of the power supply 100 controllably switches the switches 132 in or associated with a respective circuit path including the primary winding 162-1 of transformer 162 to convey energy to the secondary winding 162-2. One or more of the switches 132 may be connected in series. The switching of switches 132 causes a change in a magnitude of current flowing through the primary winding 162-1. The secondary stage 152-2 of the power converter 122 converts the received energy from the primary winding 162-1 into the output voltage 123 that powers the load 118.

Note that each of the power converters 121, 122, etc., (a.k.a., a voltage converter) as described herein is any suitable type of power supply or power converter. For example, as previously discussed, each of the power converters 121, 122, etc., can be configured to take the form of an asymmetrical half bridge flyback voltage converter. The power converter 121 can be configured in any suitable manner.

As further discussed herein, in one example, the controller 140 controls switching operation of the power converter 121 (such as a first asymmetrical half bridge flyback power converter) to supply first output current 122-1 from a secondary winding SW1 of the power converter 121 during a first portion of a switch control cycle to produce an output voltage 123. The first power converter 121 is operative to block current through the secondary winding SW1 during a second portion of the control cycle. Yet further, in one example, the controller 140 controls switching operation of a second power converter 122 to supply second output current 122-2 from a secondary winding SW2 of the second power converter 122 during the second portion of the switch control cycle to produce the output voltage 123. The second power converter 122 is operative to block current through the secondary winding SW2 during the first portion of the control cycle.

As previously discussed, in one example, the first power converter 121 (such as a first asymmetrical half bridge flyback power converter) is a first resonant power converter;

the second power converter 122 (such as an asymmetrical half bridge flyback power converter) is a second resonant power converter.

Yet further as discussed herein, depending on operating conditions, the controller 140 can be configured to adjust a magnitude of a common switching frequency used to generate the control signals 101, 102, etc., respectively applied to the first asymmetrical half bridge flyback power converter 121 and the second asymmetrical half bridge flyback power converter 122 to regulate a magnitude of the output voltage 123 (and/or respective output currents 122) outputted to the load 118.

Figure 2:
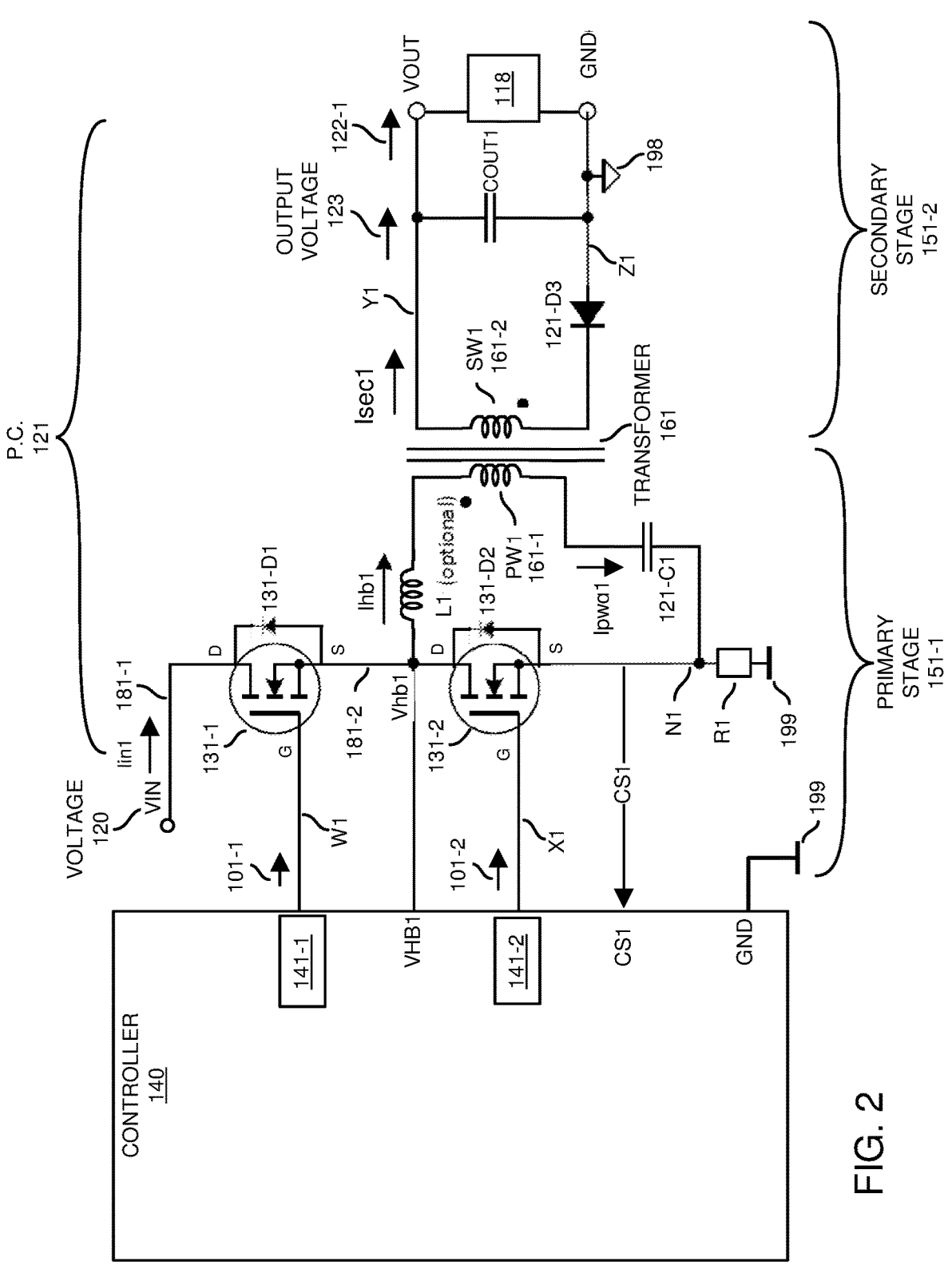
FIG. 2 is an example diagram illustrating a first power converter phase as described herein.

FIG. 2 is a diagram illustrating a controller and a more detailed rendition of an example power supply according to embodiments herein.

In this example, the switch 131-1 is instantiated as a field effect transistor including a respective body diode 131-D1, gate (G), drain (D), and source(S). Additionally, the switch 131-2 is instantiated as a field effect transistor including a respective body diode 131-D2, gate (G), drain (D), and source(S).

Driver 141-1 (such as high side switch driver circuitry) of the controller 140 is electrically connected to the gate of switch 131-1 via control signal 101-1. The drain node of the switch 131-1 (and node 181-1) is connected to receive the input voltage 120. At node 181-2, the source node of the switch 131-1 is connected to the drain node of switch 131-2. Switch 131-1 and switch 131-2 are connected in series.

Driver 141-2 (such as low side switch driver circuitry) of the controller 140 is electrically connected to drive the gate of switch 131-2 via control signal 101-2. The source node of switch 131-2 is directly connected to the first ground reference potential 199 or to the node N1, which is optionally connected to the reference potential 199 through a resistor R1.

As further shown, the body diode 131-D1 (inherent or parasitic diode) is disposed between the source node of switch 131-1 and the drain node of switch 131-2. The body diode 131-D2 is connected between the source node of switch 131-2 and the drain node of switch 131-2.

In accordance with further examples, the power converter 121 includes a resonant circuit path (combination of inductor L1, primary winding 161-1, and resonant capacitor 121-C1) disposed between the node 181-2 and the node N1. More specifically, the resonant circuit path includes a series connection of inductor L1 (optional component) connected between the node 181-2 and the input of the primary winding 161-1. The primary winding 161-1 is connected in series with the capacitor 121-C1 between an output node of the primary winding 161-1 and the node N1.

The body diode 131-D2 (inherent or parasitic diode) of switch 131-2 is disposed between the source node of switch 131-2 and the drain node of switch 131-2.

As further shown, the secondary winding 161-2 is connected in series with diode 121-D3 between node Y1 and node Z1. The combination of secondary winding 161-2 and diode 121-D3 are connected in series between node Y1 and the second ground reference potential 198 (such as different than the first ground reference potential 199).

Capacitor Cout1 is connected between node Y1 and the second ground reference potential 198 (a.k.a., node Z1).

As previously discussed, the primary winding 161-1 of the transformer 161 is disposed in a resonant circuit path such as the circuit path including a combination of the inductor L1, primary winding 161-1, and the capacitor 121-C1 (a.k.a., Cr). The controller 140 controls a magnitude of the switching frequency associated with the control signals 101 (such as including control signal 101-1 and control signal 101-2) at or around the resonant frequency associated with the resonant circuit path including the primary winding 161-1 and capacitor 121-C1. Note that the current Ipw1 flows through the resonant circuit path.

Activation of the switch 131-1 to an ON state (while the switch 131-2 is set to an OFF state) stores energy received from the input voltage 120 in the resonant circuit path as well as conveys energy from the primary winding 161-1 to the secondary winding 161-2. Activation of the switch 131-2 to an ON state (while the switch 131-1 is set to an OFF state) dissipates energy stored in the resonant circuit path through the primary winding 161-1 to the secondary winding 161-2. This results in a flow of output current 122-1 from the diode 121-D3 through the secondary winding SW1 to the load 118.

Figure 3:
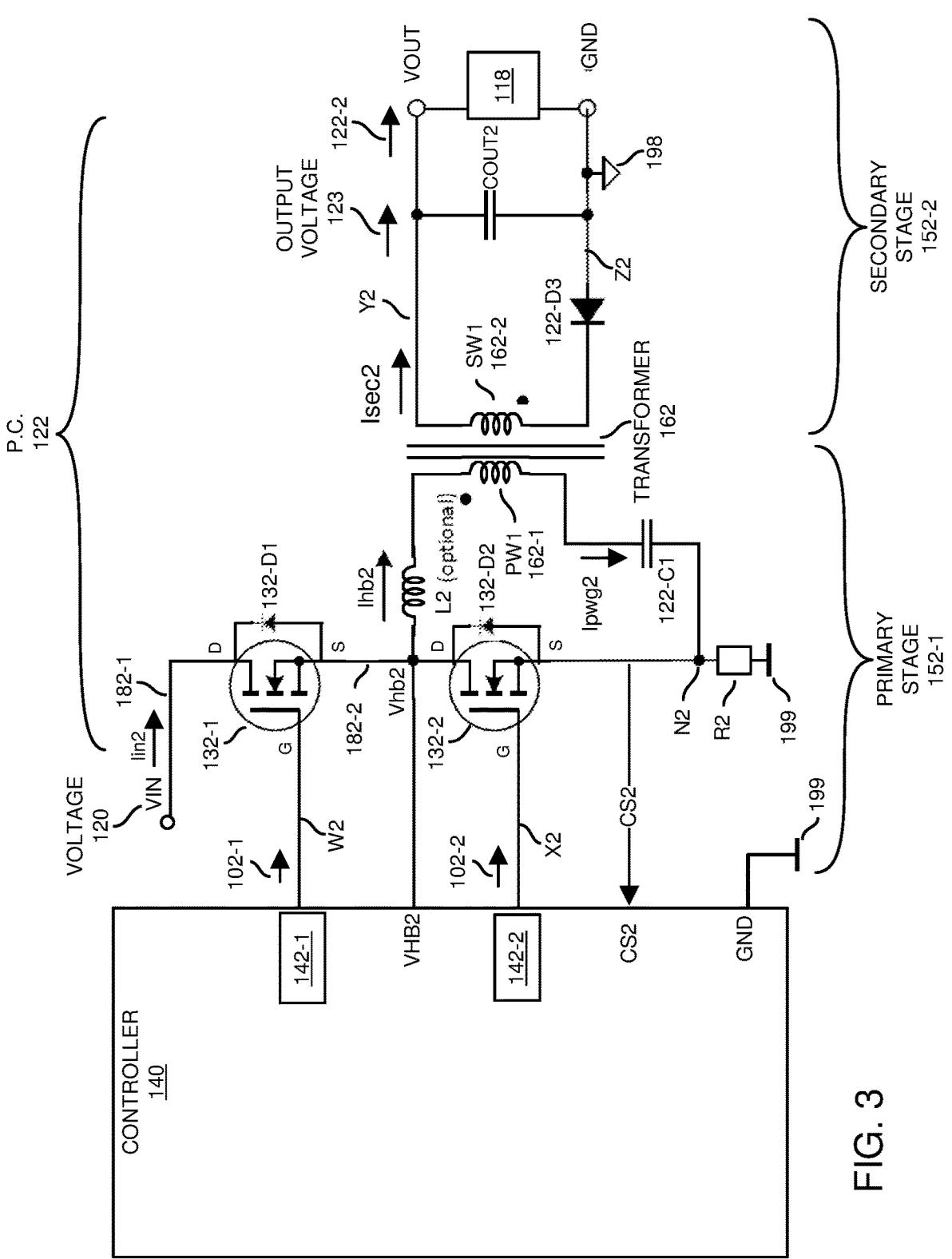
FIG. 3 is an example diagram illustrating a second power converter phase as described herein.

FIG. 3 is a diagram illustrating a controller and a more detailed rendition of an example power supply according to embodiments herein.

In this example embodiment, the switch 132-1 is instantiated as a field effect transistor including a respective body diode 132-D1, gate (G), drain (D), and source(S). Additionally, the switch 132-2 is instantiated as a field effect transistor including a respective body diode 132-D2, gate (G), drain (D), and source(S).

Driver 142-1 (such as high side switch driver circuitry) of the controller 140 is electrically connected to the gate G of switch 132-1 to supply control signal 102-1 to control the switch 132-1. The drain node D of the switch 132-1 (and node 182-1) is connected to receive the input voltage 120. At node 182-2, the source node S of the switch 132-1 is connected to the drain node D of switch 132-2. Switch 132-1 and switch 132-2 are connected in series.

Driver 142-2 (such as low side switch driver circuitry) of the controller 140 is electrically connected to drive the gate of switch 132-2 to supply control signal 102-2. The source node of switch 132-2 is directly connected to a first ground reference potential 199 or to the node N1, which is optionally connected to the reference potential 199 through a resistor R1.

As further shown, the body diode 132-D1 (inherent or parasitic diode) is disposed between the source node of switch 132-1 and the drain node of switch 132-2. The body diode 132-D2 is connected between the source node of switch 132-2 and the drain node of switch 132-2.

In accordance with further examples, the power converter 122 includes a resonant circuit path (combination of inductor L2, primary winding 162-1, and resonant capacitor 122-C1) disposed between the node 182-2 and the node N2. More specifically, the resonant circuit path includes a series connection of inductor L1 (optional component) connected between the node 182-2 and the input of the primary winding 162-1. The primary winding 162-1 is connected in series with the capacitor 122-C1 between an output node of the primary winding 162-1 and the node N2.

The body diode 132-D2 (inherent or parasitic diode) of switch 132-2 is disposed between the source node of switch 132-2 and the drain node of switch 132-2.

As further shown, the secondary winding 162-2 is connected in series with diode 122-D3 between node Y2 and node Z2. The combination of secondary winding 162-2 and diode 122-D3 are connected in series between node Y2 and the second ground reference potential 198 (such as different than the first ground reference potential 199).

Capacitor Cout2 is connected between node Y2 and the second ground reference potential 198.

As previously discussed, the primary winding 162-1 of the transformer 162 is disposed in a resonant circuit path such as the circuit path including a combination of the inductor L2, primary winding 162-1, and the capacitor 122-C1 (a.k.a., Cr). The controller 140 controls a magnitude of the switching frequency associated with the control signals 102 (such as including control signal 102-1 and control signal 102-2) at or around the resonant frequency associated with the resonant circuit path including the primary winding 162-1 and capacitor 122-C1. Note that the current Ipwg2 flows through the resonant circuit path.

Activation of the switch 132-1 to an ON state (while the switch 132-2 is set to an OFF state) stores energy received from the input voltage 120 in the resonant circuit path as well as conveys energy from the primary winding 162-1 to the secondary winding 162-2. Activation of the switch 132-2 to an ON state (while the switch 132-1 is set to an OFF state) dissipates energy stored in the resonant circuit path through the primary winding 162-1 to the secondary winding 162-2.

Figure 4:
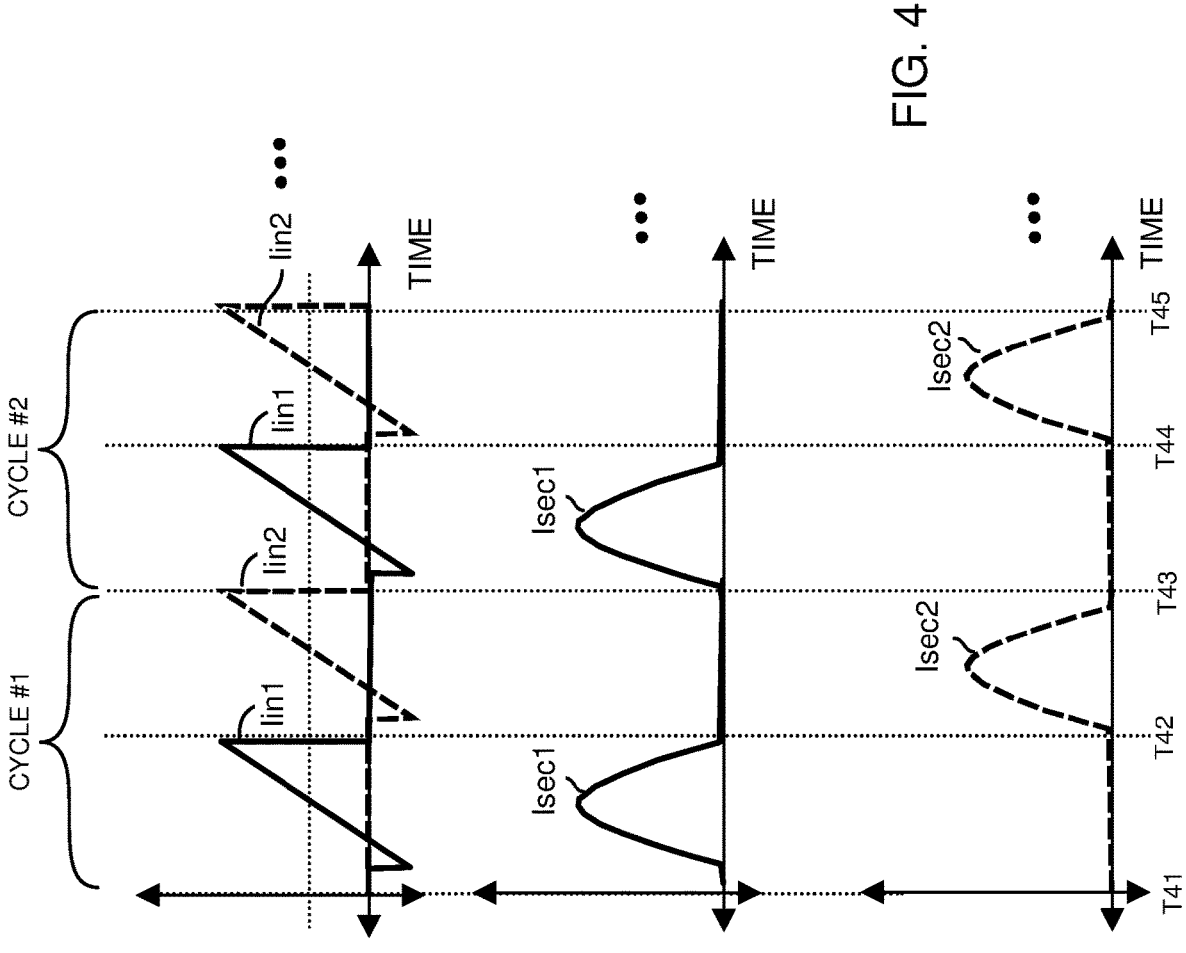
FIG. 4 is an example diagram illustrating input current versus output current associated with multiple power converter phases as described herein.

FIG. 4 is an example diagram illustrating input current versus output current associated with multiple power converter phases as described herein.

In this example, during control cycle #1, the controller 140 generally controls switch 131-1 and switch 132-2 to an ON-state and switches 131-2 and 132-1 to an OFF-state between time T41 and time T42. This causes current to flow through the primary winding 161-1, resulting in the flow of current Isec1 through the secondary winding 161-2 and diode 121-D3 to produce the output voltage 123 and output current 122-1. Diode 122-D3 blocks a flow of negative current through the secondary winding SW2 between time T41 and time T42.

Further, during control cycle #1, the controller 140 generally controls switch 132-1 and switch 131-2 to an ON-state and switches 132-2 and 131-1 to an OFF-state between time T42 and time T43. This causes current to flow through the primary winding 162-1, resulting in the flow of current Isec2 through the secondary winding 162-2 and diode 122-D3 to produce the output voltage 123 and output current 122-2. Diode 121-D3 blocks a flow of negative current through the secondary winding SW1 between time T42 and time T43.

Thus, each of the power converters supplies different output current at different time during a respective control cycle.

Figure 5:
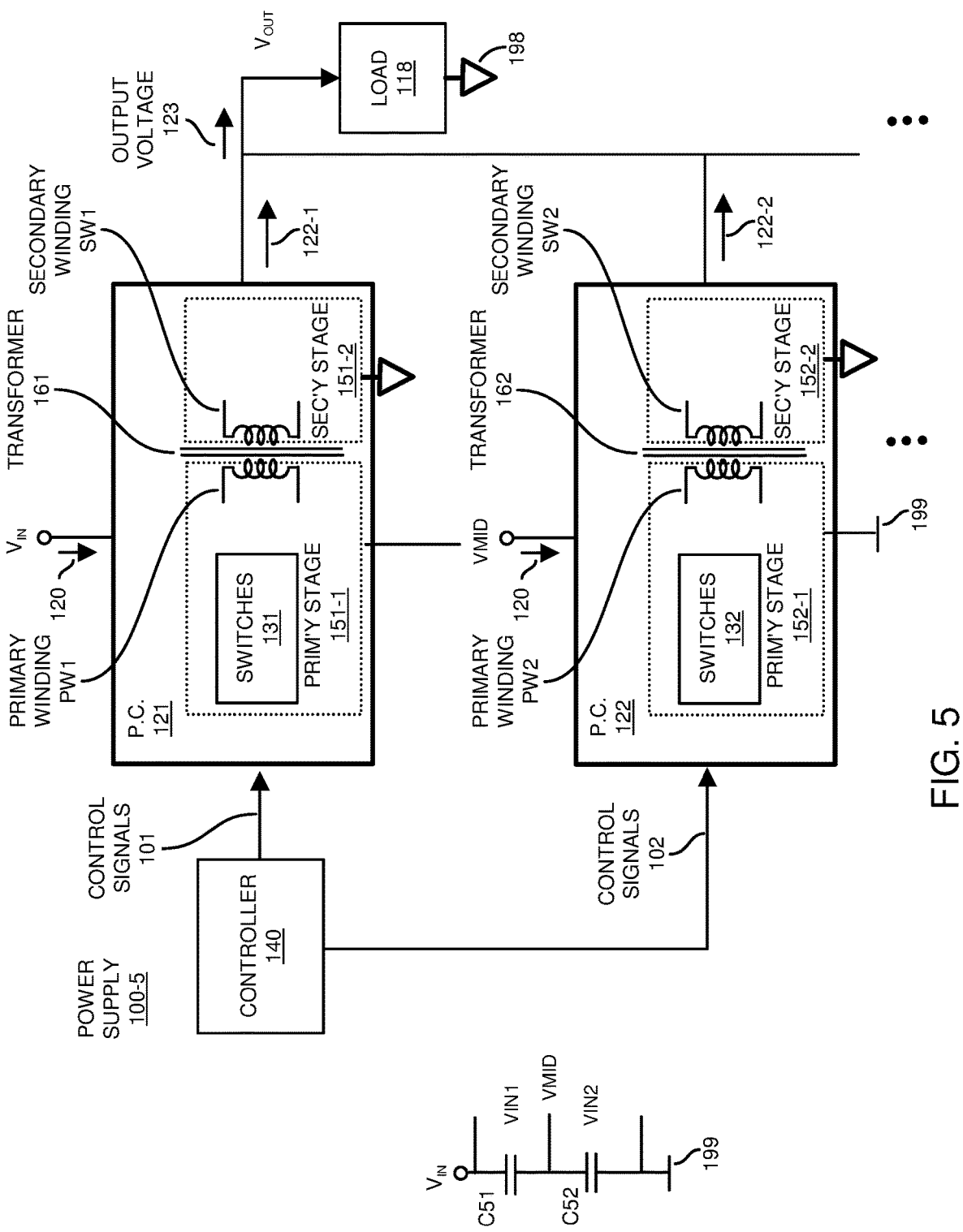
FIG. 5 is an example diagram illustrating implementation of multiple power converters disposed in series as described herein.

FIG. 5 is an example diagram illustrating implementation of multiple power converters disposed in series as described herein.

In this example, the power converter 121 and power converter 122 are connected in series between the input voltage source Vin and the ground reference 199 node. Capacitor C51 and capacitor C52 are connected in series between the input voltage source Vin and the corresponding ground reference potential node 199. In such an instance, the primary stage 151-1 receives the input voltage 120 and is referenced with respect to the voltage VMID. The primary stage 152-1 receives the voltage VMID as the input voltage and is referenced with respect to the ground reference potential 199.

In general, during one example operation, the corresponding power converter 121 and power converter 122 are controlled such that a magnitude of the voltage VIN1 (such as VIN1=VIN/2) applied to the power converter 121 is equal to the magnitude of the voltage VIN2 (such as VIN2=VIN/2) applied to the power converter 122.

Accordingly, in one example, the first asymmetrical half bridge flyback power converter 121 is connected in series between an input voltage source Vin and a reference voltage (199). The controller is operative to regulate a magnitude of a voltage at a node (such as VMID) coupling the first asymmetrical half bridge flyback power converter 121 and the second asymmetrical half bridge flyback power converter 122 to substantially equalize a magnitude of the first current 122-1 (or primary winding PW1 current) and the second current 122-2 (or primary winding PW2 current).

Figure 6:
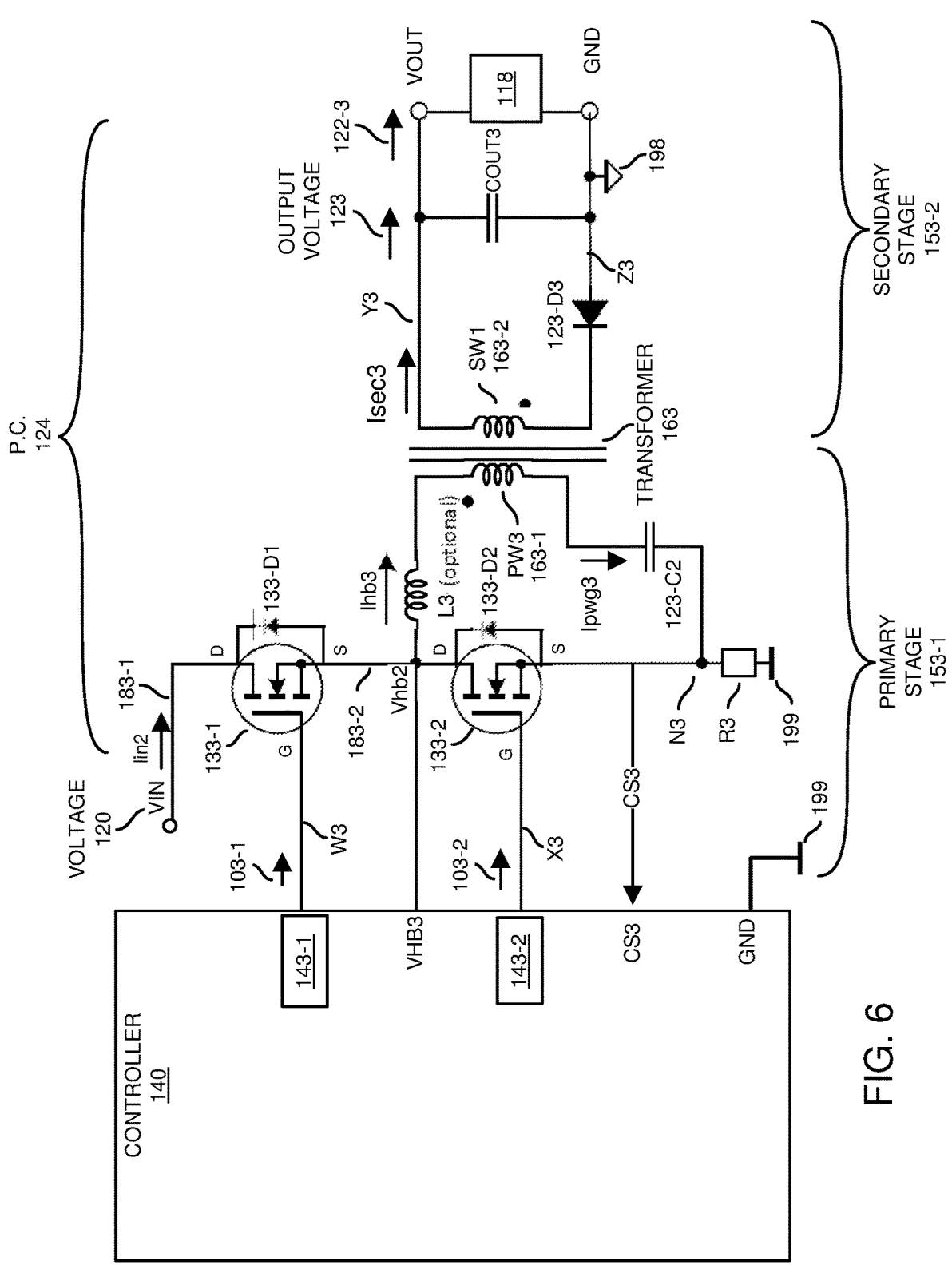
FIG. 6 is an example diagram illustrating a third power converter phase as described herein.

FIG. 6 is an example diagram illustrating third power converter phases as described herein.

In this example of power converter 124 (such as a third power converter), the switch 133-1 is instantiated as a field effect transistor including a respective body diode 133-D1, gate (G), drain (D), and source(S). Additionally, the switch 133-2 is instantiated as a field effect transistor including a body diode 133-D2, a gate (G), drain (D), and source(S).

Driver 143-1 (such as high side switch driver circuitry) of the controller 140 is electrically connected to the gate G of switch 133-1. The drain node D of the switch 133-1 (and node 183-1) is connected to receive the input voltage 120. At node 183-2, the source node S of the switch 133-1 is connected to the drain node D of switch 133-2. Switch 133-1 and switch 133-2 are connected in series.

Driver 143-2 (such as low side switch driver circuitry) of the controller 140 is electrically connected to drive the gate of switch 133-2. The source node of switch 133-2 is directly connected to a first ground reference potential 199 or to the node N3, which is optionally connected to the reference 199 through a resistor R3.

As further shown, the body diode 133-D1 (inherent or parasitic diode) is disposed between the source node of switch 133-1 and the drain node of switch 133-2. The body diode 133-D2 is connected between the source node of switch 133-2 and the drain node of switch 133-2.

In accordance with further examples, the power converter 124 includes a resonant circuit path (combination of inductor L3, primary winding 163-1, and resonant capacitor 123-C1) disposed between the node 183-2 and the node N3. More specifically, the resonant circuit path includes a series connection of inductor L3 (optional component) connected between the node 183-2 and the input of the primary winding 163-1. The primary winding 163-1 is connected in series with the capacitor 123-C1 between an output node of the primary winding 163-1 and the node N3.

The body diode 133-D2 (inherent or parasitic diode) of switch 133-2 is disposed between the source node of switch 133-2 and the drain node of switch 133-2.

As further shown, the secondary winding 163-2 is connected in series with diode 123-D3 between node Y3 and node Z3. The combination of secondary winding 163-2 and diode 123-D3 are connected in series between node Y3 and the second ground reference potential 198 (such as different than the first ground reference potential 199).

Capacitor Cout3 is connected between node Y3 and the second ground reference potential 198.

As previously discussed, the primary winding 163-1 of the transformer 163 is disposed in a resonant circuit path such as the circuit path including a combination of the inductor L3, primary winding 163-1, and the capacitor 123-C1 (a.k.a., Cr). The controller 140 controls a magnitude of the switching frequency associated with the control signals 103 (such as including control signal 103-1 and control signal 103-2) at or around the resonant frequency associated with the resonant circuit path including the primary winding 163-1 and capacitor 123-C1. Note that the current Ipwg3 flows through the resonant circuit path.

Activation of the switch 133-1 to an ON state (while the switch 133-2 is set to an OFF state) stores energy received from the input voltage 120 in the resonant circuit path as well as conveys energy from the primary winding 163-1 to the secondary winding 163-2. Activation of the switch 133-2 to an ON state (while the switch 133-1 is set to an OFF state) dissipates energy stored in the resonant circuit path through the primary winding 163-1 to the secondary winding 163-2.

Figure 7:
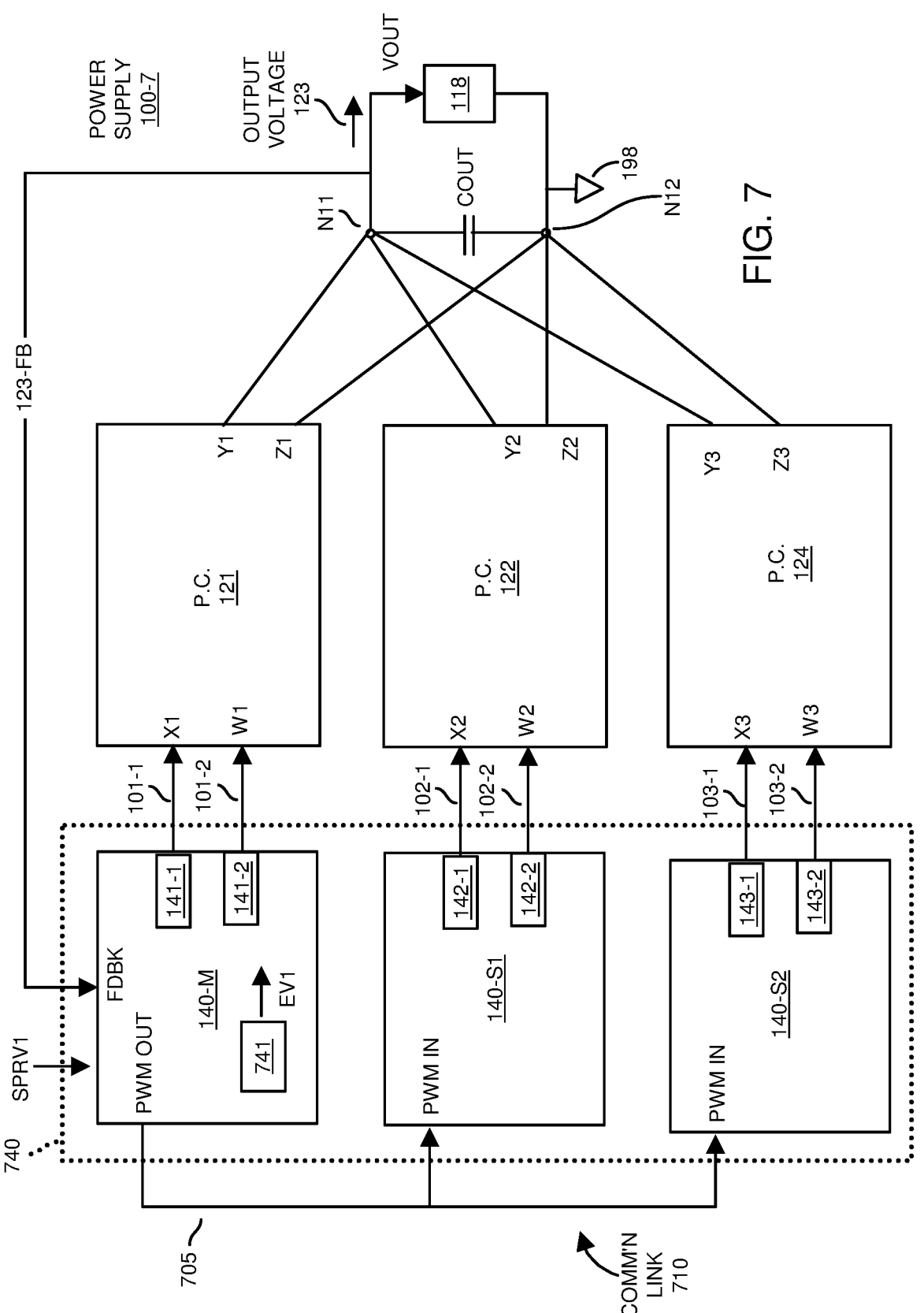
FIG. 7 is an example diagram illustrating implementation of a master controller and multiple slave controllers to control multiple power converter phases as described herein.

FIG. 7 is an example diagram illustrating implementation of a master controller and multiple slave controllers to control multiple power converter phases as described herein.

In this example, the controller 140 includes a master controller 140-M and one or more slave controllers such as slave controller 140-S1, slave controller 140-S2, etc.

The master controller 140-M controls the power converter 121 via generation of the control signals 101-1 and 101-2. Additionally, the master controller 140-M controls operation of each of the slave controllers 140-S1, slave controller 140-S2, etc., via communication of corresponding communications 705 (over communication link 720) to each of the slave controllers.

Yet further as shown, based on input from the master controller 140-M, the slave controller 140-S1 controls the power converter 122; the slave controller 140-S2 controls the power converter 124, and so on.

As shown, the combination of the master controller 140-M, slave controller 140-S1, slave controller 140-S2, etc., can be co-located on a common or single semiconductor chip 740. Alternatively, note that each of the controllers can be implemented in different individual semiconductor chips. More specifically, the master controller 140-M can be implemented via a first semiconductor chip, the slave controller 140-S1 can be implemented via a second semiconductor chip, the slave controller 140-S2 can be implemented via a third semiconductor chip; and so on.

Yet further, as discussed herein and as its name suggests, the master controller 140-M controls operation of the slave controller 140-S1 and the slave controller 140-S2. For example, the master controller 140-M can be configured to receive feedback such as output voltage feedback signal 123-FB, which indicates a magnitude of the output voltage 123 supplied to the corresponding dynamic load 118. Based on the feedback, the controller 140-M controls the respective power converters 121, 122, 124, etc., in a manner as further discussed herein.

The controller 140-M is operative to switch both of the first asymmetrical half bridge flyback power converter 121, the second asymmetrical half bridge flyback power converter 122, and the third asymmetrical half bridge flyback power converter 124, and so on, at a common switching frequency. The switching frequency of operation can be chosen based on any suitable parameter. An example of implementing a common switching frequency to control each of the different power converters 121, 122, 123, etc., is shown in FIG. 8.

Via the communications 705 over communication link 710, the master controller 140-M provides notification of a desired switching frequency or switching period (TD1) to each of the respective slave controller 140-S1 and slave controller 140-S2. The slave controllers control generation of the respective control signals 102-1, 102-2, 103-1, and 103-2 at the specified switching frequency.

Figure 8:
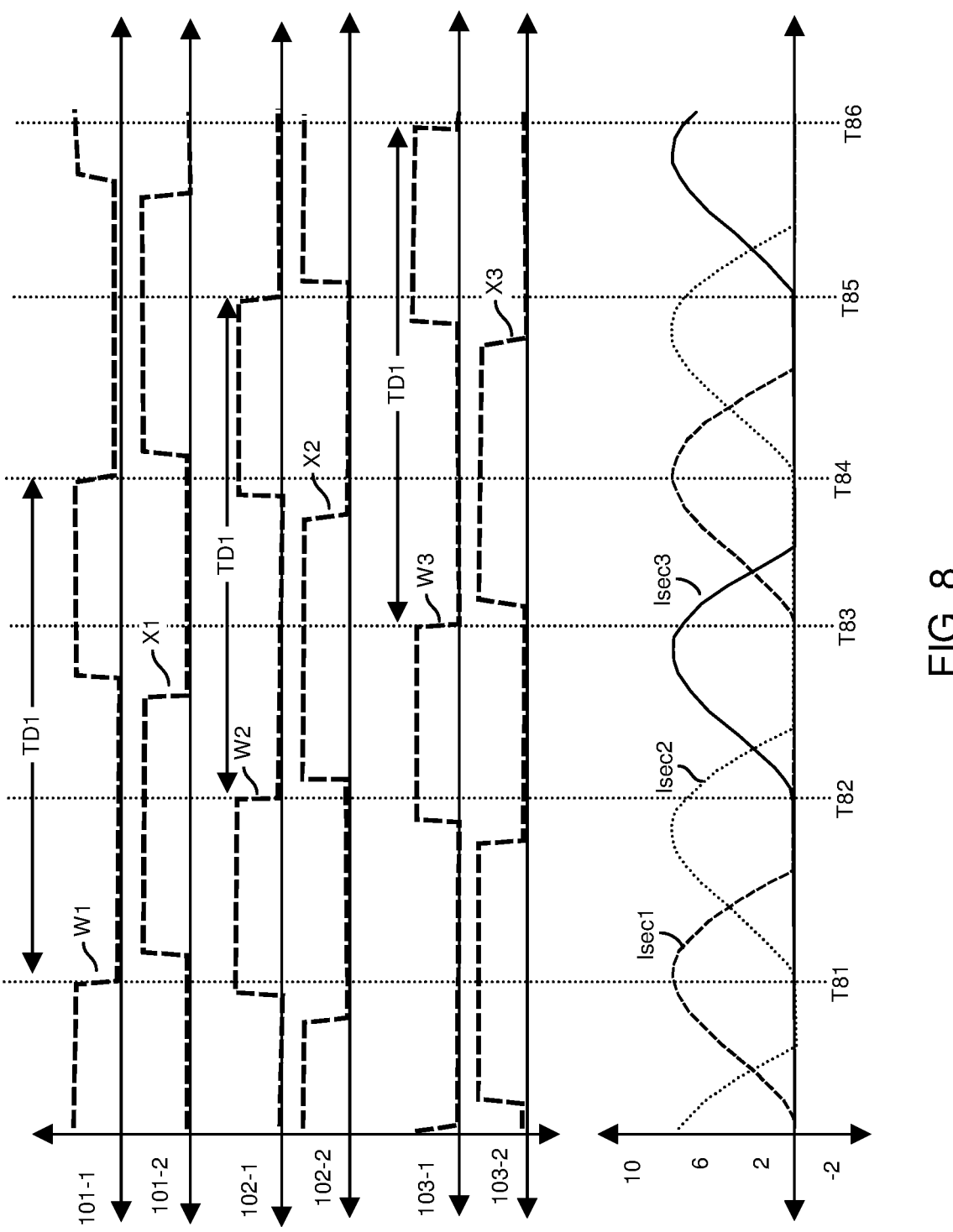
FIG. 8 is an example timing diagram illustrating application of control signals and corresponding generated secondary winding current as described herein.

More specifically, as shown in FIG. 8, the master controller 140-M switches the control signals 101-1 and 101-2 at a switching frequency based on the period between time T81 and time T84 (that is time duration TD1 as controlled by the master controller 140-M); the master controller 140-M controls switching of the control signals 102-1 and 102-2 generated by the slave controller 140-S1 at a switching frequency based on the period between time T83 and time T86 (that is time duration TD1 as controlled by the master controller 140-M); the master controller 140-M controls switching of the control signals 103-1 and 103-2 generated by the slave controller 140-S2 at a switching frequency based on the period between time T83 and time T86 (that is time duration TD1); and so on. Thus, via communications 705, the master controller 140-M controls switching frequency associated with control signals 102-1, 102-2, 103-1, 103-2, etc.

In this example as in FIG. 8, the controller 140-M generates corresponding control information (such as communications 705) to control operation of each of the power converters out output phase with respect to each other by 120 degrees. Based on application of control signals to the power converters as shown in the timing diagram 800, current flows through the respective secondary windings SW1, SW2, and SW3 to produce the respective output currents and output voltage 123 in a manner as previously discussed.

Referring again to FIG. 7, as previously discussed, the master controller 140 (a.k.a., master controller portion) is operative to control switches 131 in the first asymmetrical half bridge flyback power converter 121 to produce the output voltage 123; based on control input from the master controller 140-M as indicated by communications 705, the first slave controller 140-S1 control switches 132 in the second asymmetrical half bridge flyback power converter 122 to produce the output voltage 123; based on control input from the master controller 140-M, the second slave controller 140-S2 control switches 133 in the third asymmetrical half bridge flyback power converter 124 to produce the output voltage 123; and so on.

As further shown, the master controller 140 such as output voltage feedback signal 123-FB associated with generation of the output voltage 123. Based on a difference in magnitude of the feedback signal 123-FB with respect to the setpoint reference value SPRV1, the comparator 741 produces the error signal EV1 indicating a difference between the magnitude of the output voltage feedback signal 123-FB and the received setpoint reference voltage SPRV1. As previously discussed, the master controller 140-M controls a magnitude of the switching frequency (as defined by 1/TD1, where time duration TD1 is a selected switching period which may change over time) of generating the respective control signals 101, 102, 103, etc., used to respectively control switches 131, 132, 133, etc., to produce a respective output currents 122-1, 122-2, 122-3, etc., from the respective asymmetrical half bridge flyback power converter. Each of the respective output currents contributes to generation of the output voltage 123.

Based on the error voltage EV1, the master controller 140-M also generates respective duty cycle control information indicating corresponding duty cycle information associated with generation of one or more control signals 101-1, 101-2, 102-1, 102-2, 103-1, and 103-2. When the error voltage EV1 indicates that the output voltage 123 has dropped below the setpoint reference voltage SPRV1, the master controller 140-M increases a respective duty cycle of each of the controllers activating a respective high side switch circuitry in the parallel power converters. Conversely, when the error voltage EV1 indicates that the output voltage 123 has raised above the setpoint reference voltage SPRV1, the master controller 140-M decreases a respective duty cycle of each of the controllers activating a respective high side switch circuitry in the power converters.

In one example, the master controller 140-M implements the increase and or decrease in the duty cycle of controlling the respective high side switch circuitry in the power converter 121 as well as communicates corresponding change in duty cycle control information via communications 705 to the respective slave controllers 140-S1 and 140-S2 such that each of the power converters is operative at a common switching frequency and duty cycle control.

In a further example, note that the master controller 140-M can be configured to determine how many of the power converters are to be simultaneously activated to produce the output voltage 123. For example, for higher conditions, the master controller 140-M can be configured to simultaneously activate all of the power converters 121, 122, 124, etc., to produce the respective output voltage 123. In such an instance, the master controller 140-M provides notification to the slave controller 140-S1 and provides notification to the slave controller 140-S2 (such as via communication 705) that both of the slave converters are to be activated to generate the output voltage.

Depending upon the number of power converters that are simultaneously activated, the controller 140-M determines appropriate phase shift with respect to control signals 101 for each of the slave controllers.

For example, when a combination of the power converter 121, power converter 122, and power converter 124 are simultaneously activated, the master controller 140-M notifies the slave controller 140-S1 to generate the corresponding control signals 102 with a 120 degrees phase shift with respect to the control signals 101; the master controller 140-M notifies the slave controller 140-S2 to generate the corresponding control signals 103 with a 240 degrees phase shift with respect to the control signals 101. See FIG. 8 as an example in which a time duration between T81 and T82 is 120 degrees (falling edge of signal W2 is 120 degrees out of phase with respect to the falling edge of signal W1); a time duration between T82 and T83 is 240 degrees (falling edge of signal W3 is 240 degrees out of phase with respect to the falling edge of signal W1).

When a combination of the power converter 121 and power converter 122 (two power converters instead of 3) are simultaneously activated (power converter 124 deactivated), the master controller 140-M notifies the slave controller 140-S1 to generate the corresponding control signals 102 with a 180 degrees phase shift with respect to the control signals 101.

Accordingly, examples herein include the master controller 140-M providing notification of pulse width modulation control information including the desired switching frequency and corresponding duty cycle in which each of the slave controllers is to generate a respective control signals. Additionally, the master controller 140-M provides notification of the required phase shift associated with generating the corresponding control signals 102, 103, etc.

Note further that the controller 140 (such as master controller 140-M, slave controller 140-S1, slave controller 140-S2, etc.) can be configured to implement a respective feedback control loop based on output current instead of output voltage. In other words, the master controller 140-M can be configured to receive notification of a magnitude of respective output current supplied by the combination of power converters to the load 118. The master controller 140-M implements the operations as previously discussed. However, the power converters a regulated total output current based upon the output current from each phase instead of the output voltage.

Thus, the controller 140-M is operative to control operation of integer value N asymmetrical half bridge flyback power converters including the first asymmetrical half bridge flyback power converter 121, the second asymmetrical half bridge flyback power converter 122, the third asymmetrical half bridge flyback power converter 124, etc. The master controller 140-M applies different phase shifts associated with first control signals 101 controlling the first asymmetrical half bridge flyback power converter 121 and second control signals 102 controlling the second asymmetrical half bridge flyback power converter 122 depending on how many of the N asymmetrical half bridge flyback power converters are simultaneously activated to produce the output voltage 123.

Figure 9:
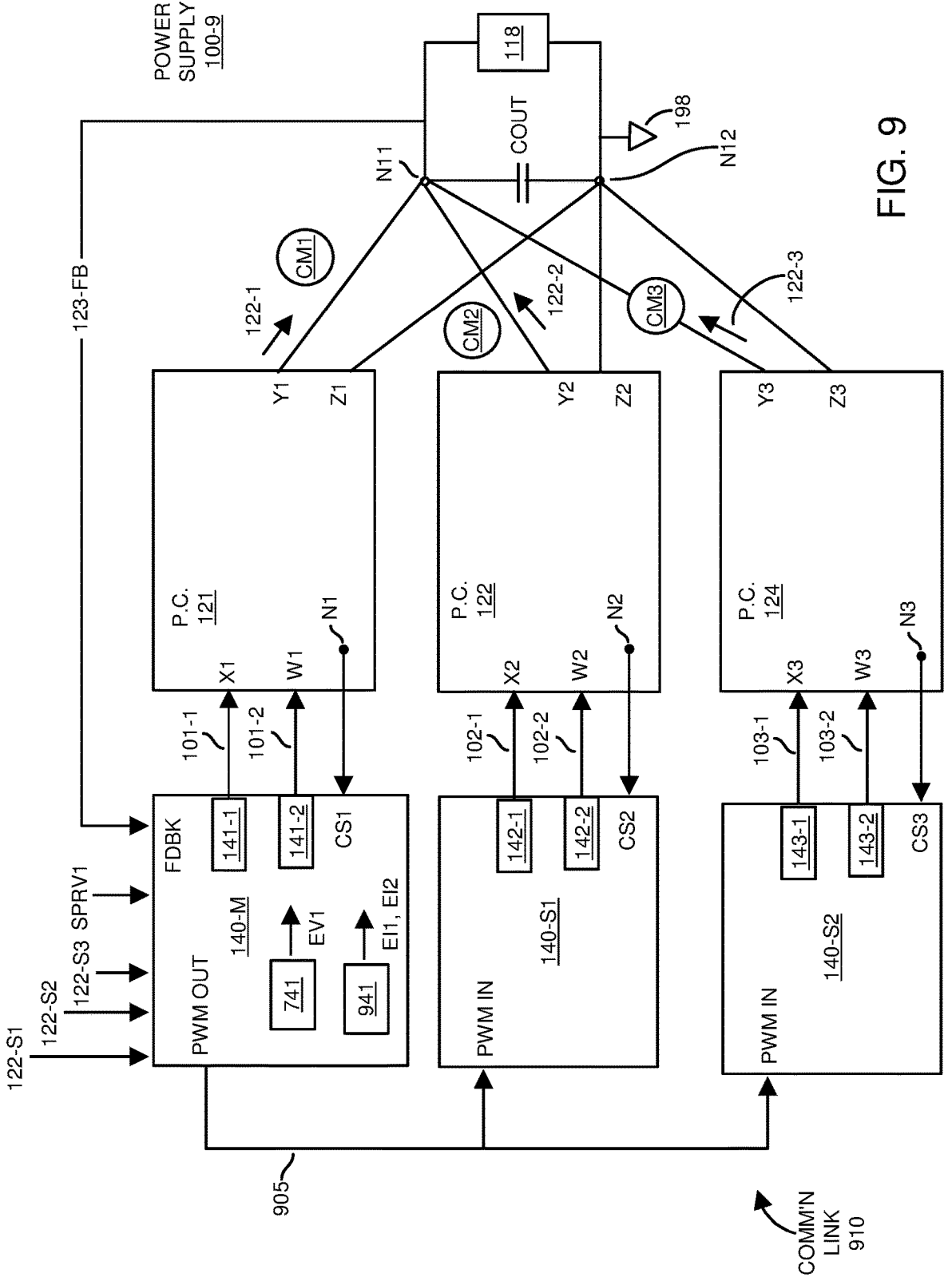
FIG. 9 is an example diagram illustrating implementation of a master controller and multiple slave controllers as well as current monitoring in a power supply system as described herein.

FIG. 9 is an example diagram illustrating implementation of a master controller and multiple slave controllers as well as current monitoring in a power supply system as described herein.

As previously discussed, the master controller 140-M controls the power converter 121 via generation of the control signals 101-1 and 101-2. Additionally, the master controller 140-M controls operation of each of the slave controllers 140-S1, slave controller 140-S2, etc., via communication of corresponding communications 905 (over communication link 920) to each of the slave controllers. The master controller 140-M switches between activation and deactivation of the one or more power converter 122, power converter 124, etc., depending on a magnitude of current required to power the load 118. For low output current conditions, the master controller 140-M can be configured to deactivate the power converter 122, power converter 124, etc.

In one example, the power supply and corresponding controller 140 is configured to implement a first feedback control loop (such as a voltage feedback control loop based on output voltage feedback signal 123-FB as previously discussed) to control magnitudes of the first current 122-1, second current 122-2, and third output current 122-3 to maintain a magnitude of the output voltage 123 with respect to the setpoint reference voltage SPRV1. Additionally, note that the power supply and corresponding controller 140-M can be configured to implement one or more second feedback control loops (such as one or more current control feedback loops) to balance (such as equalize) a magnitude of the first output current 122-1, second output current 122-2, and a magnitude of the third output current 122-3.

Note that the magnitude of the output current from each of the power converters can be monitored in any suitable manner. For example, in one example, controller 140 can be configured to: monitor a magnitude of the output current 122-1 via monitoring signal CS1 (such as peak current Ipwg1 through the primary winding PW1) at node N1; monitor a magnitude of the output current 122-2 via monitoring signal CS2 (such as peak current Ipwg2 through the primary winding PW2) at node N2; monitor a magnitude of the output current 122-3 via monitoring signal CS3 (such as peak current Ipwg3 through the primary winding PW3) at node N3; and so on.

Note further that the equalization of magnitudes of the output current from the power converters can be achieved in any suitable manner.

For example, the master controller 140-M can be configured to provide output current correction information (such as target magnitude information or setpoint information) to each of the slave controllers 140-S1 and 140-S2. As previously discussed, the slave controller 140-S1 can be configured to monitor the magnitude of the output current 122-2. Based on the received current correction information such as a setpoint reference current value (or other suitable information) and detected peak magnitude of current as indicated by the signal CS1 at node N1 or other technique of determining a magnitude of the output current 122-2, the slave controller 140-S1 can be configured to adjust the duty cycle of generating the control signals 102 such that the output current 122-2 provided by the power converter 122 is substantially equal to the magnitude of the output current 121 provided by the power converter 121. Based on the received current correction information such as a setpoint reference current value (or other suitable information) and detected peak magnitude of current as indicated by the signal CS2 at node N2 or other technique of determining a magnitude of the output current 122-3, the slave controller 140-S2 can be configured to adjust the duty cycle of generating the control signals 103 such that the output current 122-3 provided by the power converter 124 is substantially equal to the magnitude of the output current 121 provided by the power converter 121. Thus, the master controller 140-M can be configured to provide notification of duty cycle (master duty cycle) and switching period associated with generation of the control signals 101. The slave controller 140-S1 can be configured to tweak the master duty cycle up or down as needed such that the magnitude of the output current 122-2 equals a magnitude of the output current 122-1; the slave controller 140-S2 can be configured to tweak the master duty cycle up or down as needed such that the magnitude of the output current 122-3 equals a magnitude of the output current 122-1; and so on.

In accordance with yet further examples as discussed herein, the controller 140 as discussed herein can be configured to: i) implement a first current monitor CM1 to determine a respective magnitude of the output current 122-1 supplied by the power converter 121 to the load 118; ii) implement a second current monitor CM2 to determine a respective magnitude of the output current 122-2 supplied by the power converter 122 to the load 118; iii) implement a third current monitor CM3 to determine a respective magnitude of the output current 122-1 supplied by the power converter 121 to the load 118.

The current monitors can be implemented at any suitable location.

Current monitor CM1 generates signal 122-S1 indicating a respective magnitude of the output current 122-1 supplied to the load 118; current monitor CM2 generates signal 122-S2 indicating a respective magnitude of the output current 122-2 supplied to the load 118; current monitor CM3 generates signal 122-S3 indicating a respective magnitude of the output current 122-3 supplied to the load 118.

As further shown, the comparator 941 can be configured to receive the signals 122-S1, 122-S2, and 122-S3. The comparator 941 is operative to produce error information EI1 indicating a difference between a magnitude of the first output current 122-1 and the second output current 122-2. Via communications 905, the master control 140-M forwards the error information EI1, desired switching frequency, desired duty cycle, and phase shift (with respect to control signals 101) of generating the signals 102 over communication link 910 to the slave controller 140-S1. Accordingly, the slave controller 140-S1 receives pulse with modulation information including a switching frequency in corresponding duty cycle in which to generate the signals 102 as well as corresponding phase shift information.

In one example, the error information EI1 represents output current correction information for use by the slave controller 140-S1 to adjust the corresponding control signals 102-1 and 102-2 to equalize the magnitude of the output current 122-2 to the magnitude of the output current 122-1. As further shown and as previously discussed, the slave controller 140-S1 can be configured to monitor the signal CS2 generated by the node N2 to determine current supplied through the primary winding PW2 to produce the corresponding output current 122-2. The current through the primary winding PW2 is indicative of current through the secondary winding SW2 and generally the output current 122-2. The slave controller 140-S1 uses the received correction information (such as including error information EI1) to adjust the corresponding duty cycle of producing the control signal 102-1 such that the output current 122-2 to substantially equal the output current 122-1.

Thus, the first slave controller 140-S1 can be configured to: i) monitor a magnitude of the second output current 122-2 supplied by the second asymmetrical half bridge flyback power converter 122 based on a magnitude of current Ipwg2 through the primary winding PW2 of the second asymmetrical half bridge flyback power converter 122. Via signals 102-1 and 102-2, the slave controller 140-S1 adjusts a duty cycle of controlling the switches 132-1 and 132-2 based on the received error information (such as EI1) and the magnitude of current through the primary winding PW2 to equalize the output current 122-2 to the output current 122-1.

The error information EI2 represents output current correction information for use by the slave controller 140-S2 to adjust the corresponding control signals 103-1 and 103-2 to equalize the magnitude of the output current 122-3 to the magnitude of the output current 122-1. As further shown and as previously discussed, the slave controller 140-S3 can be configured to monitor the signal CS3 generated by the node N3 to determine current supplied through the primary winding PW3 to produce the corresponding output current 122-3. The current through the primary winding PW3 is indicative of current through the secondary winding SW3 and generally the output current 122-2. The slave controller 140-S2 uses the received correction information (such as including error information EI2) to adjust the corresponding duty cycle of producing the control signal 103-1 such that the output current 122-3 to the output current 122-1.

Thus, the second slave controller 140-S2 can be configured to: i) monitor a magnitude of the third output current 122-3 supplied by the second asymmetrical half bridge flyback power converter 124 based on a magnitude of current Ipwg3 through the primary winding PW3 of the second asymmetrical half bridge flyback power converter 124. The slave controller 140-S2 adjusts a duty cycle of controlling the switches 133-1 and 133-2 based on the received error information and the magnitude of current through the primary winding PW3 to substantially equalize the output current 123-2 to the output current 122-1.

Accordingly, techniques as discussed herein include the master controller 140-M and/or one or more of slave controller 140-S: i) monitoring a magnitude of a first output current 122-1 supplied by the first asymmetrical half bridge flyback power converter 121 to the load 118; ii) monitoring a magnitude of a second output current 122-2 supplied by the first asymmetrical half bridge flyback power converter 122 to the load 118; i) monitoring a magnitude of a third output current 122-3 supplied by the third asymmetrical half bridge flyback power converter 124 to the load 118. To balance or equalize the magnitude of the first output current, the magnitude of the second output current, and the magnitude of the third output current 122-3, the master controller 140-M and/or slave controllers: i) adjust a first duty cycle of controlling current through a primary winding PW1 of the first resonant flyback power converter 121 resulting in adjustment of the output current 122-1 supplied by the secondary winding SW1; ii) adjust a second duty cycle of controlling current through a primary winding PW2 of the second resonant flyback power converter 122 resulting in adjustment of the output current 122-2 supplied by the secondary winding SW2; iii) adjust a third duty cycle of controlling current through a primary winding PW3 of the third resonant flyback power converter 124 resulting in adjustment of the output current 122-3 supplied by the secondary winding SW3; and so on.

If desired, control of magnitudes of the input voltages can include controlling a magnitude of the voltage at node N1 to a desired setpoint voltage; controlling a magnitude of the voltage at node N2 to a desired setpoint voltage; and so on. Accordingly, embodiments herein include the first asymmetrical half bridge flyback power converter 121 connected in series between an input voltage source Vin a reference voltage such as ground reference voltage potential 199. The one or more controller 140 are operative to regulate a magnitude of a voltage at a node N1 coupling the first asymmetrical half bridge flyback power converter and the second asymmetrical half bridge flyback power converter to a value such as Vin/2 to substantially equalize a magnitude of the first current 121-1 and output current 121-2. In such an instance, there is no need to m on the output current, but instead the duty cycle of operating the power converter 122 is controlled to maintain a magnitude of the voltage at node N1 as Vin/2.

Thus, a first feedback loop of the output voltage feedback signal 123-FB provides regulation of the output voltage 123 with respect to the setpoint reference voltage SPRV1. The second feedback loops associated with regulation of the voltage at one or more of nodes N1, N2, etc., can be used to equalize magnitudes of the output currents 122-1, 122-2, 122-3, etc.

In accordance with yet further examples, the master controller 140-M can be configured to communicates pulse width modulation information such as switching frequency and duty cycle information, phase shift information, and Vcin correction information to each of the slave controllers. Each of the slave controllers can be configured to provide output current correction (to equalize output currents) based on the respective slave controllers monitoring voltages at nodes N2, N3, etc., (such as via duty cycle correction or peak current control).

Architecture Configuration

Two cases: A) Primary and secondary power converters in parallel, and B) Series primary and secondary power converters in parallel (enable High Vin with low voltage switches)

Control methods for lowest input and output RMS currents

Keep the synchronized operation and switching frequency Fsw (or average Fsw) yields shared line with PWM info (duty and Fsw)

Master/slave(s) concept

Figure 10:
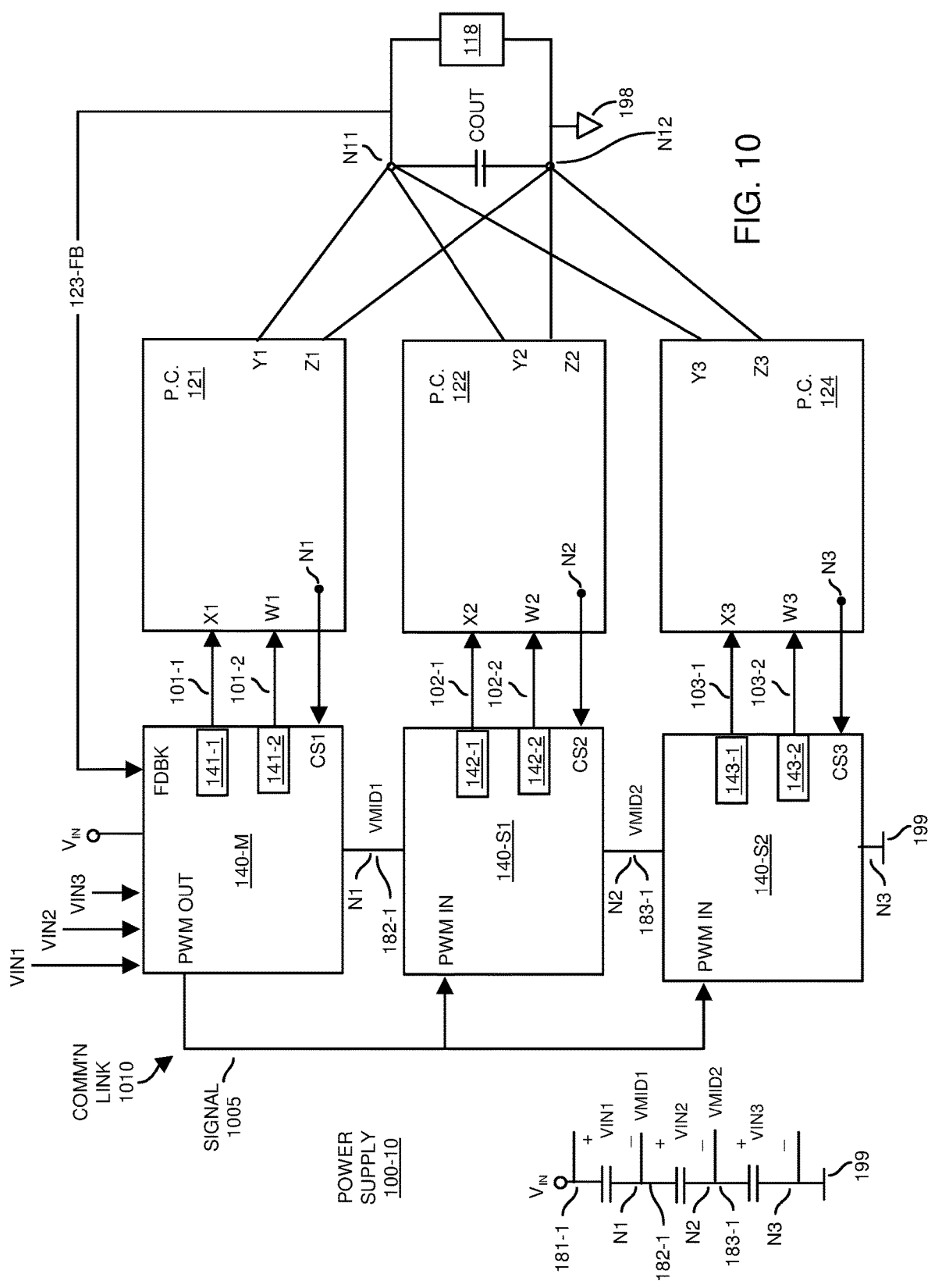
FIG. 10 is an example diagram illustrating implementation of a master controller and multiple slave controllers as well as input voltage monitoring in a power supply system as described herein.

Phase shift of 2 or more converters operation to ensure that RMS currents seen at the input and output are lower than single stage converter Feedback error signal from slaves to master Balanced current sharing by:

i) Sense and control the average magnetizing current of the stages to share the output load ii) Sense and control the capacitors voltage sharing in case input connected in series iii) Sense and control the output average current or power iv) Distribute control with communication or Single controller for all stages FIG. 10 is an example diagram illustrating implementation of a master controller and multiple slave controllers as well as input voltage monitoring in a power supply system as described herein.

In this example, the master controller 140-M receives a first voltage signal VN1 indicating a magnitude of the voltage difference between the input voltage node Vin and the voltage VMID1 at node N1; the master controller 140-M receives a first voltage signal VN2 indicating a magnitude of the voltage difference between the voltage VMID1 at node N1 and the voltage VMID2 at node N2; the master controller 140-M receives a third voltage signal VN3 indicating a magnitude of the voltage difference between the voltage at node VMID2 and the reference voltage 199 at node N3.

The master controller 140-M and corresponding one or more slave controllers as discussed herein can be configured to control output current from each of the respective power converters such that the magnitude of the input voltage Vin1=Vin2=Vin3.

Figure 11:
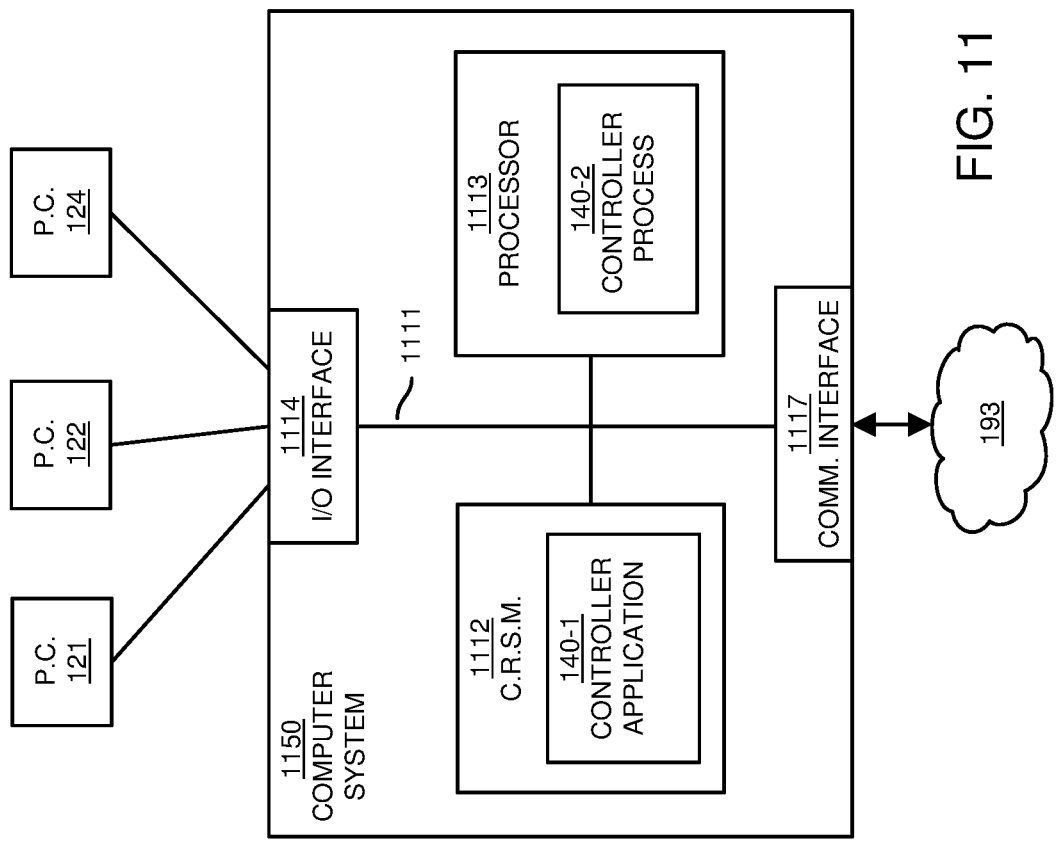
FIG. 11 is an example diagram illustrating computer architecture operable to execute one or more operations associated with each of one or more control functions as discussed herein.

FIG. 11 is an example block diagram of a computer system for implementing any of the operations as previously discussed as discussed herein.

Any of the resources (such as controller 140, controller 140-M, controller 140-S1, controller 140-S2, etc.) as discussed herein can be configured to include computer processor hardware (such as computer system 1150) and/or corresponding executable instructions (such as controller application 140-1) to carry out the different operations as discussed herein.

As shown, computer system 1150 of the present example includes an interconnect 1111 that couples computer readable storage media 1112 such as a non-transitory type of media (which can be any suitable type of hardware storage medium in which digital information can be stored and retrieved), a processor 1113 (computer processor hardware), I/O interface 1114, and a communications interface 1117.

I/O interface(s) 1114 supports connectivity to one or more power converters.

Computer readable storage medium 1112 can be any hardware storage device such as memory, optical storage, hard drive, floppy disk, etc. In one embodiment, the computer readable storage medium 1112 stores instructions and/or data.

As shown, computer readable storage media 1112 can be encoded with controller application 140-1 (e.g., including instructions) to carry out any of the operations as discussed herein.

During operation of one embodiment, processor 1113 accesses computer readable storage media 1112 via the use of interconnect 1111 in order to launch, run, execute, interpret or otherwise perform the instructions in controller application 140-1 stored on computer readable storage medium 1112. Execution of the controller application 140-1 produces controller process 140-2 to carry out any of the operations and/or processes as discussed herein.

Those skilled in the art will understand that the computer system 1150 (such as controller or controller functions) can include other processes and/or software and hardware components, such as an operating system that controls allocation and use of hardware resources to execute controller application 140-1.

In accordance with different embodiments, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1150 may reside at any location or can be included in any suitable resource in any network environment to implement functionality as discussed herein.

Functionality supported by the different resources will now be discussed via flowcharts in FIG. 12. Note that the steps in the flowcharts below can be executed in any suitable order.

FIG. 12 is a flowchart 1300 illustrating an example method as discussed herein. Note that there will be some overlap with respect to concepts as discussed above.

In processing operation 1310, the controller 140 controls switching operation of the power converter 121 (such as a first asymmetrical half bridge flyback power converter) to supply first output current 122-1 from a secondary winding SW1 of the power converter 121 during a first portion of a switch control cycle to produce an output voltage 123. The first power converter 121 is operative to block current through the secondary winding SW1 during a second portion of the control cycle.

In processing operation 1320, the controller 140 controls switching operation of a second power converter 122 to supply second output current 122-2 from a secondary winding SW2 of the second power converter 122 during a second portion of the switch control cycle to produce the output voltage 123. The second power converter 122 is operative to block current through the secondary winding SW2 during the first portion of the control cycle.

Note again that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:

a controller operable to:

control switching of a first asymmetrical half bridge flyback power converter to supply first current from a secondary winding SW1 of the first asymmetrical half bridge flyback power converter during a first portion of a switch control cycle to produce an output voltage, the first asymmetrical half bridge flyback power converter operative to block the first current through the secondary winding SW1 during a second portion of the control cycle; and control switching of a second asymmetrical half bridge flyback power converter to supply second current from a secondary winding SW2 of the second asymmetrical half bridge flyback power converter during a second portion of the switch control cycle to produce the output voltage, the second asymmetrical half bridge flyback power converter operative to block the second current through the secondary winding SW2 during the first portion of the control cycle.

2. The apparatus as in claim 1, wherein the controller is operative to switch both of the first asymmetrical half bridge flyback power converter and the second asymmetrical half bridge flyback power converter at a common switching frequency.

3. The apparatus as in claim 1, wherein the first asymmetrical half bridge flyback power converter is a resonant power converter; and wherein the second asymmetrical half bridge flyback power converter is a resonant power converter.

4. The apparatus as in claim 3, wherein the controller is further operative to adjust a magnitude of a common switching frequency applied to the first asymmetrical half bridge flyback power converter and the second asymmetrical half bridge flyback power converter to regulate a magnitude of output current supplied by the output voltage to a load.

5. The apparatus as in claim 1, wherein the controller is further operative to: i) implement a first feedback control loop to control magnitudes of the first current and the second current to maintain a magnitude of the output voltage, and ii) implement a second feedback control loop to equalize a magnitude of the first current and a magnitude of the second current.

6. The apparatus as in claim 1, wherein the controller is further operative to switch between activation and deactivation of the second asymmetrical half bridge flyback power converter depending on a magnitude of a load powered by the output voltage.

7. The apparatus as in claim 1, wherein the controller is operative to control operation of N asymmetrical half bridge flyback power converters including the first asymmetrical half bridge flyback power converter and the second asymmetrical half bridge flyback power converter, wherein N is an integer number of asymmetrical half bridge flyback power converters controlled by the controller.

8. The apparatus as in claim 7, wherein the controller is further operative to apply a different phase shift associated with first control signals controlling the first asymmetrical half bridge flyback power converter and second control signals controlling the second asymmetrical half bridge flyback power converter depending on how many of the N asymmetrical half bridge flyback power converters are simultaneously activated to produce the output voltage.

9. The apparatus as in claim 1, wherein the controller is a semiconductor chip.

10. The apparatus as in claim 1, wherein the first asymmetrical half bridge flyback power converter is connected in series between an input voltage source and a reference voltage; and wherein the controller is operative to regulate a magnitude of a voltage at a node coupling the first asymmetrical half bridge flyback power converter and the second asymmetrical half bridge flyback power converter to substantially equalize a magnitude of the first current and the second current.

11. The apparatus as in claim 1, wherein the controller is further operative to:

monitor a magnitude of a first output current supplied by the first asymmetrical half bridge flyback power converter to a load;

monitor a magnitude of a second output current supplied by the second asymmetrical half bridge flyback power converter to the load; and to balance the magnitude of the first output current and the magnitude of the second output current: i) adjust a first duty cycle of controlling current through a primary winding PW1 of the first resonant flyback power converter, the secondary winding SW1 inductively coupled to the primary winding PW1; and ii) adjust a second duty cycle of controlling current through a primary winding PW2 of the second resonant flyback power converter, the secondary winding SW2 inductively coupled to the primary winding PW2.

12. The apparatus as in claim 11, wherein the monitored magnitude of the first output current is determined based on measurement of peak current through the primary winding PW1; and wherein the monitored magnitude of the second output current is determined based on measurement of peak current through the primary winding PW2.

13. The apparatus as in claim 1, wherein the controller includes:

a master controller portion operative to control first switches in the first asymmetrical half bridge flyback power converter to produce the output voltage; and a first slave controller portion operative to control second switches in the second asymmetrical half bridge flyback power converter to produce the output voltage.

14. The apparatus as in claim 13, the master controller portion is operative to:

receive feedback associated with generation of the output voltage; and based on a magnitude of the feedback with respect to a setpoint reference value, control a magnitude of a switching frequency of controlling the first switches to produce a first output current from the first asymmetrical half bridge flyback power converter, the first output current contributing to generation of the output voltage.

15. The apparatus as in claim 14, wherein the master controller portion is further operative to: i) produce error information indicating a difference between a magnitude of the first output current and the second output current, and ii) forward the error information and a the magnitude of the switching frequency to the first slave controller.

16. The apparatus as in claim 15, wherein the first slave controller portion is operative to: i) monitor a magnitude of the second output current supplied by the second asymmetrical half bridge flyback power converter based on a magnitude of current through a primary winding PW2 of the second asymmetrical half bridge flyback power converter, the primary winding PW2 inductively coupled to the second winding SW2 of the second asymmetrical half bridge flyback power converter, and ii) adjust a duty cycle of controlling the second switches based on the error information and the magnitude of current through the primary winding.

17. A method comprising:

controlling switching operation of a first asymmetrical half bridge flyback power converter to supply first current from a secondary winding SW1 of the first asymmetrical half bridge flyback power converter during a first portion of a switch control cycle to produce an output voltage, the first asymmetrical half bridge flyback power converter operative to block the first current through the secondary winding SW1 during a second portion of the control cycle; and controlling switching operation of a second asymmetrical half bridge flyback power converter to supply second current from a secondary winding SW2 of the second asymmetrical half bridge flyback power converter during a second portion of the switch control cycle to produce the output voltage, the second asymmetrical half bridge flyback power converter operative to block the second current through the secondary winding SW2 during the first portion of the control cycle.

18. The method as in claim 17, wherein the controller is operative to switch both of the first resonant flyback power converter and the second resonant flyback power converter at a common switching frequency.

19. The method as in claim 17 further comprising:
monitoring a magnitude of the first output current;
monitoring a magnitude of the second output current; and
to balance the magnitude of the first output current and the magnitude of the second output current: i) adjusting a first duty cycle of controlling current through a primary winding PW1 of the first resonant flyback power converter, the secondary winding SW1 inductively coupled to the primary winding PW1; and ii) adjusting a second duty cycle of controlling current through a primary winding PW2 of the second resonant flyback power converter, the secondary winding SW2 inductively coupled to the primary winding PW2.

20. The method as in claim 17 further comprising:
implementing a first feedback control loop to control magnitudes of the first current and the second current to maintain a magnitude of the output voltage; and
implementing a second feedback control loop to balance a magnitude of the first current and a magnitude of the second current.

* * * * *